US009815074B2

(12) United States Patent
Mauchle et al.

(10) Patent No.: US 9,815,074 B2
(45) Date of Patent: Nov. 14, 2017

(54) POWDER SUPPLY BY MEANS OF A DENSE FLUX PUMP FOR A COATING SYSTEM

(71) Applicant: GEMA SWITZERLAND GMBH, St. Gallen (CH)

(72) Inventors: Felix Mauchle, Abtwil (CH); Marco Sanwald, Abtwil (CH); Hanspeter Vieli, Goldach (CH); Hans-Peter Lüthi, Rickenbach (CH); Stefan Breitenmoser, Häggenschwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 120 days.

(21) Appl. No.: 15/021,585

(22) PCT Filed: Aug. 19, 2014

(86) PCT No.: PCT/EP2014/067649
§ 371 (c)(1),
(2) Date: Mar. 11, 2016

(87) PCT Pub. No.: WO2015/036205
PCT Pub. Date: Mar. 19, 2015

(65) Prior Publication Data
US 2016/0221013 A1 Aug. 4, 2016

(30) Foreign Application Priority Data
Sep. 12, 2013 (DE) ........................ 10 2013 218 326

(51) Int. Cl.
*B65G 53/16* (2006.01)
*B05B 7/14* (2006.01)

(52) U.S. Cl.
CPC .......... *B05B 7/1472* (2013.01); *B05B 7/1459* (2013.01)

(58) Field of Classification Search
CPC ........... B65G 53/16; B65G 53/42; F04D 7/00; B05B 7/1472
(Continued)

(56) References Cited

U.S. PATENT DOCUMENTS 3,345,111 A * 10/1967 Bies ...................... B05B 7/1404 406/138
3,554,164 A * 1/1971 West ....................... B05B 1/267 118/302
(Continued)

FOREIGN PATENT DOCUMENTS

CN 101801823 A 8/2010
DE 10234013 A1 6/2003
(Continued)

OTHER PUBLICATIONS

English translation of International Preliminary Report on Patentability dated Mar. 24, 2016, for corresponding PCT Application No. PCT/EP2014/067649.
(Continued)

*Primary Examiner* — Joseph Dillon, Jr.
(74) *Attorney, Agent, or Firm* — Kinney & Lange, P.A.

(57) ABSTRACT

The invention relates to a powder supply device for a powder coating system having at least one powder container (24), which has a powder chamber (22), and having at least one powder dispensing device, which is connected or can be connected to a powder dispensing channel (13) opening into the powder chamber (22) via a powder dispensing opening (36), in order to extract coating powder from the powder chamber (22) during powder coating operation of the powder coating system. In order to achieve as homogeneous and effective a powder conveyance as possible using the powder supply device according to the invention, the at least one powder dispensing device is designed as a powder dense
(Continued)

flux pump (4), in particular as a single-chamber powder dense flux pump (200).

23 Claims, 6 Drawing Sheets

(58) Field of Classification Search
USPC .......... 406/92, 141, 142, 143, 151, 152, 153
See application file for complete search history.

(56) References Cited

U.S. PATENT DOCUMENTS

| | | | | |
|---|---|---|---|---|
| 3,858,763 | A * | 1/1975 | MacK | B65G 53/22 222/464.1 |
| 3,933,394 | A * | 1/1976 | Klein | B65G 53/14 406/138 |
| 4,730,647 | A * | 3/1988 | Mulder | B05B 7/1404 118/308 |
| 4,824,295 | A * | 4/1989 | Sharpless | B05B 7/1404 118/312 |
| 7,163,359 | B2 | 1/2007 | Moser | |
| 7,311,474 | B1 * | 12/2007 | Ogasahara | B65G 53/14 406/143 |
| 8,444,351 | B2 * | 5/2013 | Volonte | B05B 7/1404 222/148 |
| 8,567,341 | B1 * | 10/2013 | Thies | B05B 7/1404 118/310 |
| 8,685,237 | B2 * | 4/2014 | Littman | B01F 3/12 210/134 |
| 9,382,078 | B2 * | 7/2016 | Mauchle | B05B 7/1404 |
| 9,387,995 | B2 * | 7/2016 | Mauchle | B05B 7/1404 |
| 9,597,696 | B2 * | 3/2017 | Mauchle | B05B 5/1683 |
| 9,657,740 | B2 * | 5/2017 | Mauchle | B05B 7/1404 |
| 2004/0191005 | A1 | 9/2004 | Kia et al. | |
| 2005/0028867 | A1 * | 2/2005 | Ciarelli | B05B 7/1404 137/240 |
| 2005/0207901 | A1 | 9/2005 | Klobucar et al. | |
| 2007/0095945 | A1 | 5/2007 | Kuedell et al. | |
| 2007/0163493 | A1 * | 7/2007 | Lacchia | B05B 7/1472 118/300 |
| 2008/0283630 | A1 * | 11/2008 | Thomas | B05B 7/1404 239/311 |
| 2009/0162150 | A1 | 6/2009 | Dietrich | |
| 2009/0263575 | A1 * | 10/2009 | Rodrigues | B05B 7/1472 427/185 |
| 2011/0076159 | A1 * | 3/2011 | Fulkerson | B05B 7/1459 417/165 |
| 2012/0282398 | A1 | 11/2012 | Fulkerson et al. | |
| 2013/0094912 | A1 * | 4/2013 | Mauchle | B05B 7/1404 406/122 |
| 2013/0108379 | A1 * | 5/2013 | Mauchle | B05B 7/1404 406/110 |
| 2013/0209282 | A1 * | 8/2013 | Mauchle | B05B 7/1404 417/65 |
| 2014/0048015 | A1 * | 2/2014 | Mauchle | B05B 5/1683 118/600 |

FOREIGN PATENT DOCUMENTS

| | | | |
|---|---|---|---|
| DE | 10353968 | A1 | 7/2005 |
| DE | 102007005306 | A1 | 8/2008 |
| DE | 102007005313 | A1 | 8/2008 |
| DE | 102007049169 | A1 | 4/2009 |
| EP | 0606577 | A1 | 7/1994 |
| WO | 2008099255 | A1 | 8/2008 |
| WO | 2009037564 | A1 | 3/2009 |
| WO | 2012112655 | A2 | 8/2012 |

OTHER PUBLICATIONS

First Chinese Office Action, for Chinese Patent Application No. 201480060572.7, dated Jun. 2, 2017, 10 pages.

German Office Action dated Jun. 4, 2014, for corresponding German Application No. 102013218326.7.

English translation of International Search Report dated Oct. 8, 2014, for corresponding PCT Application No. PCT/EP2014/067649.

* cited by examiner

POWDER SUPPLY BY MEANS OF A DENSE FLUX PUMP FOR A COATING SYSTEM

BACKGROUND

The present invention relates to a powder supply device for a powder coating system.

The device according to the invention is particularly suitable for supplying powder to a powder coating system used to electrostatically spray coat objects in which fresh coating powder (hereinafter also called "fresh powder") and, as applicable, reclaimed coating powder (hereinafter also called "recovered powder") is situated in the powder container and is supplied to a powder dispensing mechanism of a spraying device. The spraying device can be designed for example as a manual spray gun or an automatic spray gun.

A powder injector is normally used as the powder dispensing mechanism. It is thereby provided for compressed air from the feed air connection of the powder injector to be pushed through a venturi nozzle into the collector nozzle. On its way through the powder injector, the feed air passes across a powder suction tube connected to the powder container at which point coating powder is sucked out of the powder container due to the negative pressure.

The powder container is thereby fed fresh powder as needed via a fresh powder line from a supplier's container with which the powder supplier supplied the fresh powder to the powder user. The powder forms a compact mass in the supplier's container. By contrast, the coating powder should be in a fluidized state in the powder container so that it can be for example pumped out by the suction effect of the powder dispensing mechanism (powder injector) and be fed to the spraying device as a flow of powder. A powder supply device therefore in particular comprises a powder container serving as a powder chamber for storing coating powder, wherein the coating powder is normally fluidized in the powder container so that it can be more easily conveyed pneumatically to either another powder container or to a powder spraying device.

As already indicated, the powder spraying device can be a manual or automatic powder spraying device which can have a spray nozzle or a rotary atomizer.

SUMMARY

The powder supply device disclosed herein is based on the problem of known powder supply devices generally having a high compressed air requirement. In addition, only with difficulty can conventional powder supply devices generate a precisely adjustable continuous flow of powder.

Accordingly, a powder supply device is disclosed having a reduced compressed air need during operation and additionally achieving a maximum of precision as regards the powder flow rate.

In particular, a powder supply device for a powder coating system is disclosed having at least one powder container comprising a powder chamber for coating powder. Unlike with the known prior art powder supply devices, the inventive solution does not use a powder injector as a powder dispensing mechanism; instead at least one dense phase powder pump is provided which is connected or connectable to a powder dispensing channel emptying into the powder chamber via a powder discharge opening so as to suck coating powder out of the powder chamber during the powder coating operation of the powder coating system.

According to one aspect of the invention, the at least one dense phase powder pump of the powder supply device is designed in particular as a single-chamber dense phase powder pump comprising just one powder feed chamber for drawing the coating powder.

A plurality of advantages are achieved with the powder supply device according to embodiments of the invention. For instance, using a dense phase powder pump, particularly a single-chamber dense phase powder pump, can achieve a maximum of precision with respect to the powder feed rate. Additionally, the powder supply device consumes considerably less air with the dense phase powder pump than with powder injectors.

The powder pump is in particular directly connected or connectable to the powder dispensing channel emptying into the powder chamber via the powder discharge opening. This results in a particularly short suction distance to the benefit of the adjustability and reproducibility of the powder flow rate. Lastly, the inventive powder supply device requires considerably less space.

One preferred further development of the powder supply device provides for the powder dispensing channel to be formed in a side wall of the powder container and the dense phase powder pump be connected or connectable to the powder dispensing channel via a suction tube connector. Providing the powder dispensing channel in the side wall of the powder container can allow the powder pump to be fixed particularly close to the powder container. The powder pump is hereby fixed at a particularly close distance from the powder discharge opening configured as a suction pump. Accordingly, the lifting effort required to convey the coating powder through the powder dispensing channel is fundamentally reduced. The short suction distance also has a positive effect on the adjustability and reproducibility of the powder flow rate. The dense phase powder pump can thereby be connected or connectable to the powder dispensing channel via a separate suction tube connector. By means of the suction tube connector, it is conceivable for previously known powder containers to be retrofit with the dense phase powder pumps designed as single-chamber pumps.

The powder supply device can additionally comprise a suction tube fluidly connected or connectable to a through-hole of the suction tube connector. The suction tube is thereby in particular configured so as to be insertable into the powder dispensing channel. The suction tube, which is connected or connectable to the suction tube connector, enables the inner diameter of the powder dispensing channel to be easily varied. For example, the suction tube can thereby have an inner diameter of 3 mm to 10 mm, preferably an inner diameter of 5 mm to 8 mm, and more preferably an inner diameter of 4 mm. Reducing the diameter of the powder dispensing channel by means of the suction tube can improve the suction performance of the powder pump. This is due in particular to the reduced quantity of powder within the powder dispensing channel as well as the slower venting of the powder.

According to one embodiment of the inventive powder supply device, the suction tube comprises a hopper region of expanded inner diameter at an end section opposite the suction connector. The hopper region effectively prevents deposits of coating powder at the inlet of the suction tube. This is thus particularly the case due to the hopper region creating a gradual transition between the inner diameter of the powder dispensing channel and the inner diameter of the suction tube.

It is lastly noted that the suction tube can exhibit a length which substantially corresponds to the length of the powder channel. This thereby allows easily reducing the inner diameter of the powder channel along its entire length. As will be described in greater detail particularly in conjunction with the figures, the length of the suction tube is thereby dimensioned specifically such that the suction tube does not enter into the interior of the powder chamber.

According to a further realization of the inventive powder supply device, the powder dispensing channel comprises a lower end section via which the powder dispensing channel empties into the powder chamber through a powder discharge opening. An upper end section to which the suction tube connector is fixed or fixable is additionally provided, wherein the upper end section of the powder dispensing channel is situated at an upper end section of the powder container. In other words, the suction tube connector, and thus the dense phase powder pump, is fixed to an upper end section of the powder container. Doing so thereby prevents the coating powder from rising out of the powder chamber into the powder pump when it is switched off.

The upper end section of the powder dispensing channel can thereby comprise a preferably cylindrical recess designed to receive the preferably cylindrical suction tube connector. The suction tube connector can accordingly be easily force-fit connected to the upper end section of the powder dispensing channel. Alternatively or additionally hereto, it is of course also conceivable to use fixing means to mount the suction tube connector to the upper end of the powder dispensing channel. To this end, engaging means (e.g. retaining screws) can for example be driven into the powder container housing. It is particularly preferential for the suction tube connector to be configured and accommodated in the recess such that it projects over the upper end section of the powder container. In other words, the suction tube connector of this implementation forms an extension, whereby the at least one powder pump can be fixed to the powder container of the inventive powder supply device. It is hereby for example conceivable to fit the at least one powder pump onto the extension formed by the suction tube connector.

According to a further aspect of the inventive powder supply device, the dense phase powder pump comprises a connecting element detachably affixed to a first end section of the dense phase powder pump facing the suction tube connector. The connecting element is in particular designed so as to create a force-fit connection between the suction tube connector and the dense phase powder pump. As will be described in greater detail below, the connecting element is thereby particularly used to realize a connection between a feed channel in the powder pump and the powder dispensing channel.

Particularly in the case of the suction tube connector—as noted above—being configured as an extension, the connecting element can preferably comprise a recess formed on the end section facing the suction tube connector. The recess is in particular designed so as to receive the projecting section (extension) of the suction tube connector. Alternatively or additionally hereto, the connecting element can of course also be connected to the suction tube connector via fixing means (e.g. retaining screws).

According to a further aspect of the present invention, the dense phase powder pump comprises a powder inlet connected or connectable to the (upstream) powder dispensing channel and a powder outlet connected or connectable to the (downstream) powder reservoir on the output side or to a device for spraying the coating powder. The powder inlet can thereby be arranged on a first end section of the dense phase powder pump and the powder outlet arranged on second end section of the dense phase powder pump opposite thereto, whereby the (single) powder feed chamber is arranged between the powder inlet and the powder outlet of the dense phase powder pump. According to this embodiment, the above-cited connecting element can be designed so as to be connected or connectable to the powder inlet such that the powder inlet of the dense phase powder pump is substantially flush with an outer surface of the side wall. In other words, the powder inlet is fit as close as possible to the upper end section of the powder dispensing channel. This again reduces the suction distance, whereby the lifting effort required to convey the powder is reduced.

According to one advantageous realization of the present invention, the (preferably one) powder feed chamber of the dense phase powder pump comprises a chamber intake at a first end section and a chamber exit at an opposite second end section.

The dense phase powder pump furthermore accordingly comprises a powder inlet valve by means of which the chamber intake of the powder feed chamber can be fluidly connected or connectable to the powder inlet and a powder outlet valve by means of which the chamber exit of the single powder feed chamber can be fluidly connected or connectable to the powder outlet of the dense phase powder pump. This thus particularly allows the powder pump to operate in two different pump phases. Specifically, there is thereby an intake phase as well as a feed phase, the principle of which is known from the prior art relative to dense phase powder pumps. Hence, the inventive powder supply device achieves a particularly continuous powder supply. The powder inlet valve also prevents coating powder from infiltrating into the powder feed chamber through the powder discharge line in the deactivated state of the powder pump.

According to a further preferred embodiment of the inventive solution, a control device is further provided which is designed to alternately control the powder inlet valve and/or the powder outlet valve of the dense phase powder pump. The control device is particularly designed to alternately generate a positive pressure and a negative pressure in the (single) powder feed chamber of the dense phase powder pump. As noted above, doing so thus enables two-phase operation of the powder pump. In particular, generating a negative pressure initiates an intake phase and generating a positive pressure initiates a feed phase. It is thereby of particular advantage when the control device can control the powder inlet valve and the powder outlet valve separately from each other.

The powder inlet valve and the powder outlet valve of the inventive powder supply device are each respectively designed as a pinch valve, particularly of the design having a flexible, elastic tube as the valve channel, wherein this flexible, elastic tube can be squeezed by means of actuating compressed air in a pressure chamber surrounding the tube to close the respective valve.

In conjunction hereto, it is particularly advantageous for the powder inlet valve designed as a pinch valve and the powder outlet valve designed as a pinch valve respectively to have a pinch valve housing with a powder inlet and a powder outlet as well as an elastically pliable valve, preferably in the form of a tube section. In detail, the valve element should thereby be arranged in the interior of the pinch valve housing such that the powder inlet of the pinch valve can be brought into fluid connection with the powder outlet of the pinch valve by means of the valve element formed as a tube.

It is thereby particularly advantageous for the pinch valve housing to comprise at least one connection for supplying compressed air (actuating compressed air) as needed to the space (pressure chamber) formed between the inner wall of the pinch valve housing and the valve element arranged in the interior of the pinch valve housing. Positive pressure is generated in this pressure chamber between the inner wall of the pinch valve housing and the valve element upon actuating compressed air being supplied, in consequence of which the valve element is radially squeezed and the pinch valve closed. When a release of pressure follows in the pinch valve housing (for example by negative pressure being generated), the valve element returns to its initial state such that the valve element creates a fluid connection between the powder inlet of the pinch valve and the outlet of the pinch valve.

As already indicated, it is further conceivable in this regard for the pinch valve housing to comprise a connection to generate a negative pressure in the interior of the pinch valve housing as needed so as to thereby considerably reduce the time the pinch valve remains open.

To further increase the homogeneity of the powder flow at the powder outlet of the dense phase powder pump, and particularly to prevent the occurrence of disruptive pulsations in the dense phase powder pump's powder flow (downstream of the powder outlet), one preferential realization of the inventive solution makes use of an auxiliary pressure inlet device additionally or alternatively to the measures specified above. Said auxiliary pressure inlet device feeds into at least one point in the powder path between the powder outlet valve associated with the single powder feed chamber and the powder outlet of the dense phase powder pump or preferably directly downstream of the powder outlet of the dense phase powder pump and serves to supply additional compressed air serving as auxiliary compressed conveyor air as needed. In other words, in addition to the compressed conveyor air introduced into the powder feed chamber during the feed phase of the dense phase powder pump, the auxiliary compressed air inlet device supplies additional conveyor air directly ahead or behind of the powder outlet of the dense phase powder pump at applicable times or upon applicable events.

In accordance with a further aspect of the invention, the powder supply device comprises a plurality of dense phase powder pumps, particularly single-chamber dense phase powder pumps, each connected or connectable to a powder discharge channel of the powder chamber. The powder discharge channels of the plurality of dense phase powder pumps are thereby configured in two opposite side walls of the powder chamber. Particularly the design of the powder pump as a single-chamber dense phase powder pump enables maximizing the number of powder pumps used. This thereby achieves a particularly high pumping capacity. Of course, alternatively or additionally to fixing the powder discharge channels in the side walls of the powder chamber, it is also conceivable for them to be configured in the third and fourth side walls of the powder chamber.

According to a further embodiment, the at least one dense phase powder pump is arranged next to the powder chamber such that a side surface of the dense phase powder pump facing the powder chamber abuts an outer surface of the powder chamber side wall. Particularly in combination with the suction connector designed as an extension, this can thereby achieve the simple fitting of the dense phase powder pump on the powder chamber. The dense phase powder pump is accordingly particularly horizontally aligned and supported by the side wall of the powder chamber.

Lastly, in accordance with a further realization, it can be provided for the at least one dense phase powder pump to be arranged at a height relative to the powder chamber which substantially corresponds to the adjustable powder level in the powder chamber. As already indicated above, doing so can achieve keeping the lift required to convey the coating powder as low as possible.

The powder chamber of the powder supply device can exhibit any form, wherein preferential however is a cube-shaped, cylindrical, conical or frustoconical configuration. It is particularly conceivable in this regard for the powder chamber to be configured beneath or within a cyclone separator.

BRIEF DESCRIPTION OF THE DRAWINGS

The following will reference the embodiment examples depicted in the drawings in describing the inventive powder supply device in greater detail.

Shown are.

For reasons of clarity, analogous components will be provided with the same reference numerals in the following detailed description of the figures.

DETAILED DESCRIPTION

Figure 1:
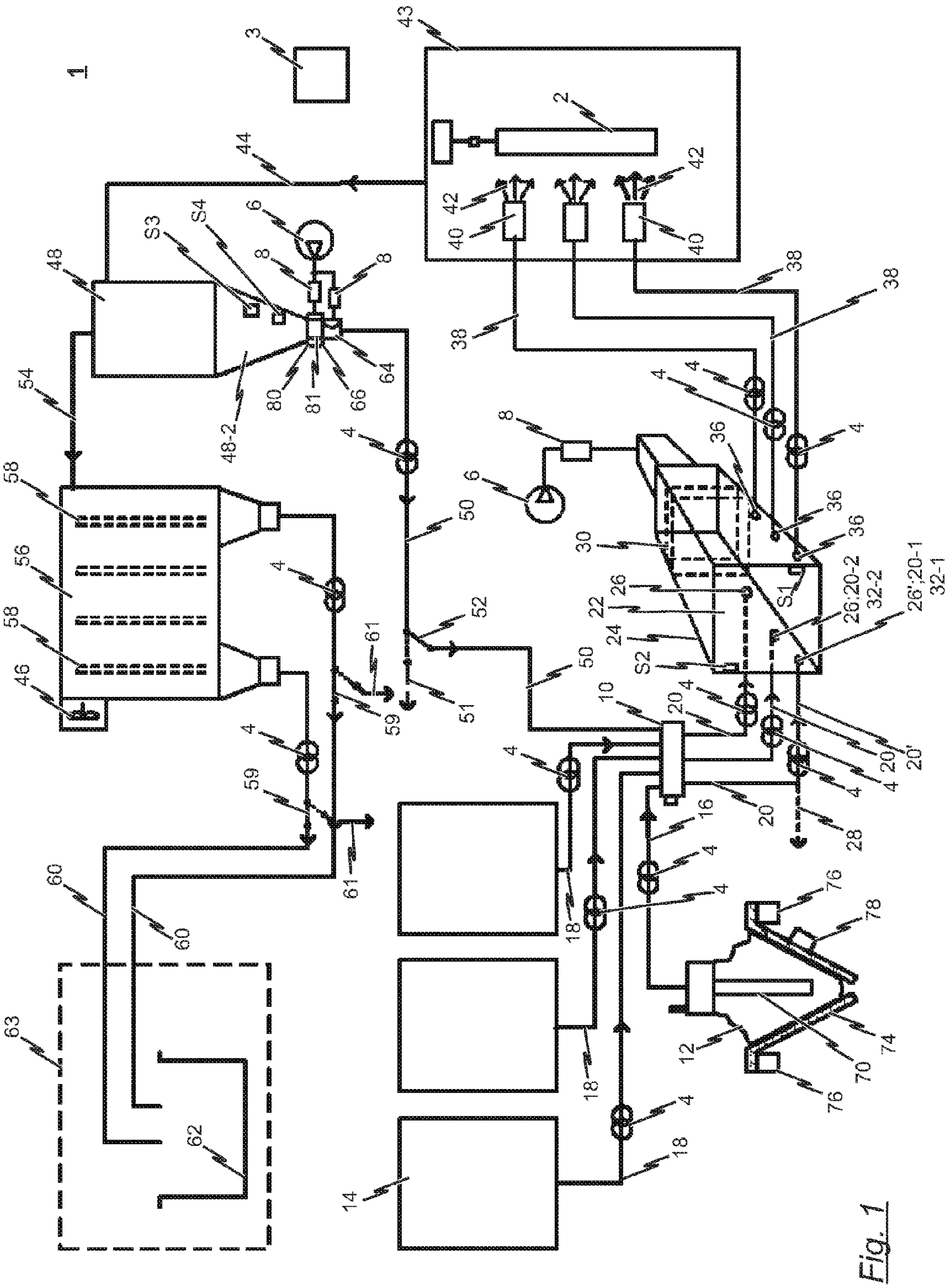
FIG. 1: a schematic representation of a powder coating system comprising a powder supply device in accordance with a first exemplary embodiment of the invention.

FIG. 1 schematically depicts an exemplary embodiment of a powder coating system 1 with an inventive powder supply device for spray coating objects 2 with coating powder, which is thereafter fused onto the objects 2 in a heating furnace not shown in FIG. 1. One or more control devices 3 are provided to control the operation of the powder coating system 1

Powder pumps 4 are provided to pneumatically pump the coating powder. These can be dense phase powder pumps in which coating powder is suctioned out of a powder container by means of negative pressure, wherein the powder is then expelled from a powder feed chamber under positive pressure and flows to a spraying device.

To generate the compressed air for the pneumatic pumping of the coating powder and the fluidizing of the coating powder, a compressed air source 6 is provided which is connected to the various devices by means of the appropriate pressure setting elements 8, for example pressure regulators and/or valves.

Fresh powder from a powder supplier is dispensed from a supplier's container, which for example can be a small container 12 e.g. in the form of a dimensionally stable container or a bag containing a powder quantity of for example between 10 and 50 kg, e.g. 25 kg, or for example a large container 14, e.g. likewise in a dimensionally stable container or a bag containing a powder quantity of for example between 100 kg and 1000 kg, into a fresh powder line 16 or 18 of a screening device 10 by means of a powder pump 4. The screening device 10 can be provided with a vibrator 11. In the following description, the terms “small container” and “large container” respectively refer both to “dimensionally stable containers” as well as “non-dimensionally stable, flexible bags” unless explicit reference is made to one or the other container type.

The coating powder screened through the screening device 10 is conveyed via one or more powder feed lines 20, 20' by gravity or preferably by a respective powder pump 4 through powder inlet openings 26, 26' into a powder chamber 22 of a dimensionally stable powder container 24. The volume of the powder chamber 22 is preferably substantially smaller than the volume of the small fresh powder container 12. According to one conceivable realization of the inventive solution, the powder pump 4 of the at least one powder feed line 20, 20' to the powder container 24 is a compressed air thrust pump. The first section of the powder feed line 20 can hereby serve as a pump chamber in which screened powder from the screening device 10 falls through a valve, for example a pinch valve. After this pump chamber holds a certain portion of powder, the powder feed line 20 is fluidly isolated from the screening device 10 by closing the valve. The portion of powder is thereafter pushed through the powder feed line 20, 20' into the powder chamber 22 by compressed air.

Powder pumps 4, e.g. dense phase powder pumps 200, are connected to one or preferably a plurality of powder outlet openings 36 in the powder container 24 to pump coating powder through the powder lines 38 to spraying devices 40. The spraying devices 40 can comprise spray nozzles or rotary atomizers to spray the coating powder 42 onto the object 2 to be coated, which is preferably situated in a coating booth 43. The powder outlet openings 36 can be—as shown in FIG. 1—situated in a wall of the powder container 24 which is opposite from the wall in which the powder inlet openings 26, 26' are situated.

Figure 2A:
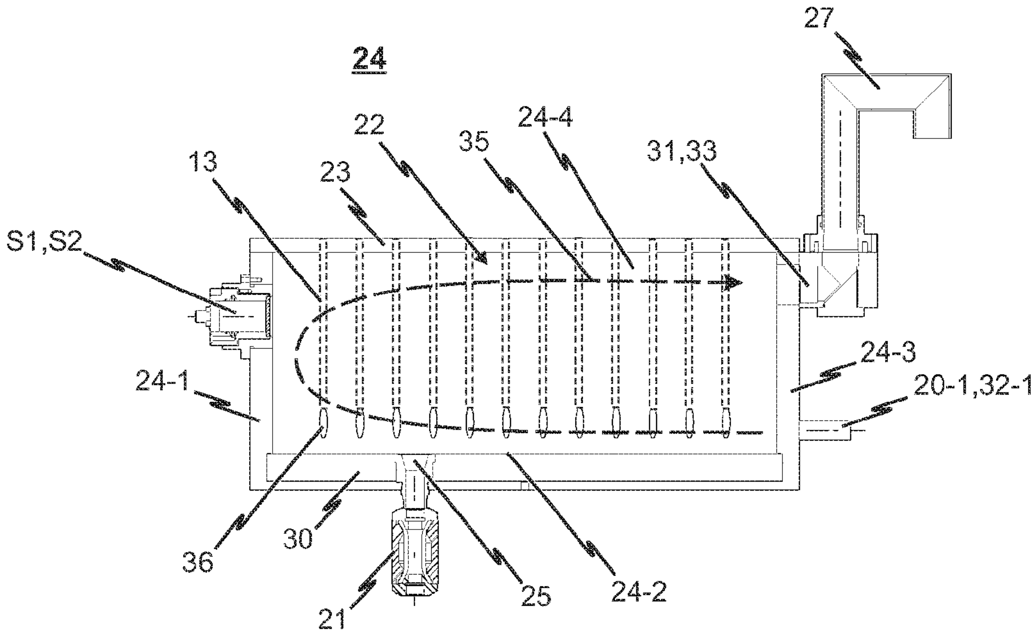
FIG. 2*a*: a longitudinal sectional side view of a powder container in accordance with an exemplary embodiment of the inventive powder supply device.
Figure 2B:
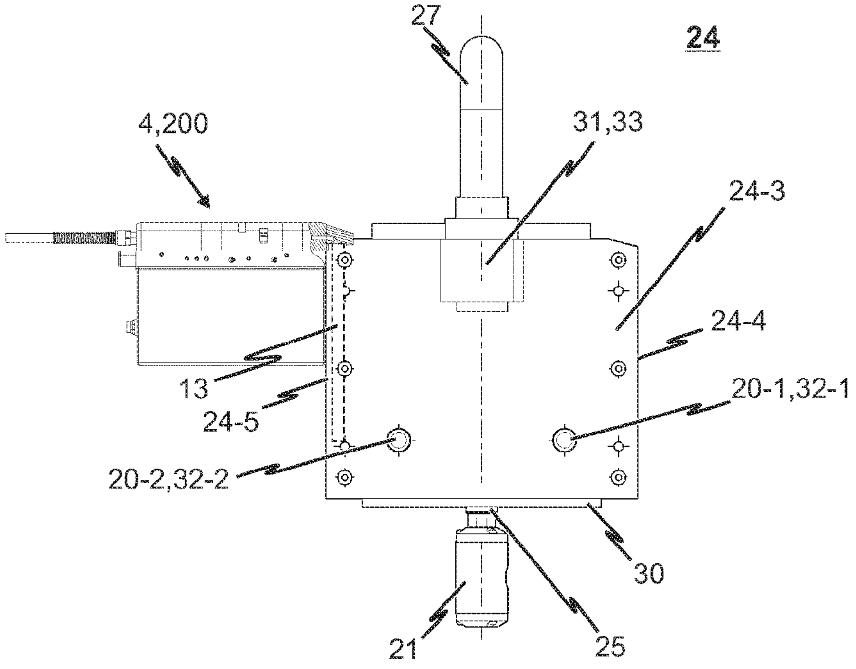
FIG. 2*b*: a view of the front side of the powder container according to FIG. 2*a* having a powder pump connected to a powder dispensing channel of the powder container.

In the embodiment of the powder container 24 depicted in FIGS. 2*a* and 2*b*, however, the powder outlet openings 36 are arranged in a wall which is adjacent to the wall in which the powder inlet openings 26, 26' are situated. The powder outlet openings 36 are preferably disposed near the bottom of the powder chamber 22. The powder chamber 22 is preferably of a size in the range of a coating powder volumetric capacity of between 1.0 kg and 12.0 kg, preferably between 2.0 kg and 8.0 kg. Pursuant other aspects, the size of powder chamber 22 is preferably between 500 $cm^3$ and 30,000 $cm^3$, preferably between 2,000 $cm^3$ and 20,000 $cm^3$. The size of the powder chamber 22 is selected as a function of the number of powder outlet openings 36 and attached powder lines 38 so as to enable continuous spray coating operation, but yet the powder chamber 22 can be quickly cleaned, preferably automatically, during coating breaks for powder changes.

The powder chamber 22 can be provided with a fluidizing device 30 for fluidizing the coating powder taken into the powder container 24. The fluidizing device 30 comprises at least one fluidizing wall of an open-pored or narrow-holed material which is permeable to compressed air but not to coating powder. Although not shown in FIG. 1, it is advantageous with the powder container 24 for the fluidizing wall to form the floor of the powder container 24 and be disposed between the powder chamber 22 and a fluidizing compressed air chamber. The fluidizing compressed air chamber is to be connectable to the compressed air source 6 by means of a pressure setting element 8.

Coating powder 42 which does not adhere to the object 2 to be coated will be sucked into a cyclone separator 48 as excess powder through an excess powder line 44 by a flow of suction air from a blower 46. The cyclone separator 48 separates as much excess powder from the suction air flow as possible. The separated portion of powder is then fed as reclaimed powder or recovered powder through a reclaimed powder line 50 from the cyclone separator 48 to the screening device 10 where it passes through the screening device 10, either alone or mixed with fresh powder via powder feed lines 20, 20', to re-enter the powder chamber 22.

Depending on the type of powder and/or how dirty the powder is, the option can also be provided of separating the reclaimed powder line 50 from the screening device 10 and routing the reclaimed (recovered) powder into a waste receptacle as is schematically depicted in FIG. 1 by dotted line 51. So that the reclaimed powder line 50 does not need to be separated from the screening device 10, it can be provided with a gate 52 by means of which it is alternatively connectable to the screening device 10 or to a waste receptacle.

The powder container 24 can be provided with one or more, for example two, sensors S1 and/or S2 to control the supply of coating powder in the powder feed lines 20, 20' to the powder chamber 22 by means of the control device 3 and the powder pumps 4. For example, the lower sensor S1 detects a lower powder level limit and the upper sensor S2 an upper powder level limit.

The lower end section 48-2 of the cyclone separator 48 can be designed and used as a storage container for reclaimed powder and provided with one or more, preferably two, sensors S3 and/or S4 operatively coupled to the control device 3 for that purpose. Doing so allows for example automatically stopping the fresh powder feed through the fresh powder feed lines 16 and 18 as long as the cyclone separator 48 contains enough reclaimed powder to supply a sufficient amount of reclaimed powder to the powder chamber 22 through the screening device 10 as required by the spraying devices 40 for the spray coating operation. When there is no longer enough reclaimed powder in the cyclone separator 48 for that purpose, there can be an automatic switching to a supply of fresh powder through the fresh powder feed lines 16 or 18. There is also the further possibility of supplying fresh powder and reclaimed powder to the screening device 10 simultaneously so that they are mixed together.

The exhaust air of the cyclone separator 48 is routed via an exhaust line 54 to an afterfilter device 56 where it runs through one or more filter elements 58 to the blower 46 and from there into the external atmosphere. The filter elements 58 can be filter bags, filter cartridges, filter plates or other similar filter elements. The powder which the filter elements 58 separate from the airflow is normally waste powder and falls into a waste receptacle under the force of gravity or it can be pumped, as shown in FIG. 1, into a waste receptacle 62 at a waste station 63 via one or more waste lines 60, each comprising a respective powder pump 4. Depending on the type of powder and powder coating conditions, the waste powder can also be reclaimed again for the screening device 10 so as to end up back in the coating circuit. This is schematically shown in FIG. 1 by gates 59 and branch lines 61 of the waste lines 60.

Multi-color operation, in which different colors are each only sprayed for a short time, normally uses the cyclone separator 48 and the afterfilter device 56, the waste powder of the afterfilter device 56 ending up in the waste receptacle 62. While the powder separating efficiency of the cyclone separator 48 is usually less than that of the afterfilter device 56, it can be cleaned faster than the afterfilter device 56. In single-color operation, in which the same powder is used for a long time, it is possible to dispense with the cyclone separator 48 and connect the excess powder line 44 instead of the exhaust air line 54 to the afterfilter device 56 and connect the waste lines 60, which in this case contain reclaimed powder, to the screening device 10 as reclaimed powder lines. The cyclone separator 48 is normally only used in combination with the afterfilter device 56 in single-color operation in cases of problematic coating powder. In such cases, only the reclaimed powder of the cyclone separator 48 will be supplied via the powder reclaimed line 50 of the screening device 10 while the waste powder of the afterfilter device 56 will end up as waste in the waste receptacle 62 or another waste receptacle which can be positioned directly below an outlet opening of the afterfilter device 56 without waste lines 60.

The lower end of the cyclone separator 48 can comprise an outlet valve 64, for example a pinch valve. A fluidizing device 66 for fluidizing the coating powder can further be provided above said outlet valve 64 in or on the lower end of the lower end section 48-2 of the cyclone separator 48 designed as a storage container. The fluidizing device 66 comprises at least one fluidizing wall 80 of an open-pored or narrow-holed material which is permeable to compressed air but not to coating powder. The fluidizing wall 80 is arranged between the powder path and a fluidizing pressure chamber 81. The fluidizing pressure chamber 81 is connectable to the compressed air source 6 by means of a pressure setting element 8. The fresh powder line 16 and/or 18 can be fluidly connected at its upstream end, either directly or by means of powder pump 4, to a powder feed line 70 able to be dipped into the supplier container 12 or 14 to draw up fresh coating powder. The powder pump 4 can be arranged in the fresh powder line 16/18 at its start, end or therebetween or at the upper or lower end of the powder feed line 70.

As a small fresh powder container, a fresh powder bag 12 is shown in FIG. 1 in a bag receiving hopper 74. The bag receiving hopper 74 keeps the powder bag 12 in a defined shape, wherein the bag opening is located at the upper end of the bag. The bag receiving hopper 74 can be disposed on a scale or on weight sensors 76. Depending on their type, said scale or weight sensors 76 can generate a visual and/or electric signal corresponding to the weight and thus also the volume of coating powder in the small container 12 minus the weight of the bag receiving hopper 74. Preferably at least one vibrational vibrator 78 is arranged in the bag receiving hopper 74. Two or more alternatingly used small containers 12 and/or two or more alternatingly used large containers 14 can be provided in a respective bag receiving hopper 74. This enables a faster change from one small container 12 or large container 14 to another.

Although not depicted in FIG. 1, it is in principle conceivable for the screening device 10 to be integrated into the powder container 24. The screening device 10 can moreover be omitted when the fresh powder is of sufficient quality. In this case, there is the further possibility of using a separate screen to filter the reclaimed powder of lines 44 and 55, for example upstream or downstream of the cyclone separator 48 or within the cyclone separator 48 itself. A screen is also not required when the quality of the reclaimed powder is sufficient for reuse.

The powder inlet openings 26, 26' are arranged in a side wall of the powder container 24, preferably close to the bottom of the powder chamber 22. In the example embodiments of the powder container 24 depicted in FIGS. 2*a* and 2*b*, at least one residual powder outlet 33 is further provided in the same side wall of the powder container 24, through which residual powder can be driven out of the powder chamber 22 during cleaning by the introduction of purifying compressed air into the powder chamber 22.

In order to be able to initiate purifying compressed air into the powder chamber 22 in the cleaning operation, the powder container 24 comprises at least one purifying compressed air inlet 32-1, 32-2 in a side wall. In cleaning operation of the powder coating system 1, the purifying compressed air inlet 32-1, 32-2 is fluidly connected to a compressed air source 6 via purifying compressed air feed lines 101-1, 101-2, 101-3 in order to supply purifying compressed air to the powder chamber 22. Preferably each purifying compressed air inlet 32-1, 32-2 comprises an inlet opening in the side wall of the powder container 24 which is identical to a powder inlet opening 26, 26' through which coating powder is fed as needed into the powder chamber 22 in the powder coating operation of the powder coating system 1. The process of cleaning the powder chamber 22 will be described in greater detail below with reference to the powder container 24 depicted in FIGS. 2*a* and 2*b*.

In the side wall of the powder container 24 in which the inlet openings of the purifying compressed air inlets 32-1, 32-2 are provided, at least one outlet opening of a residual powder outlet 33 can be further provided through which the residual powder can be driven out of the powder chamber 22 in the cleaning operation of the powder coating system 1 by means of the purifying compressed air introduced into said powder chamber 22.

As noted above, the powder container 24 is equipped with a fluidizing device 30 in order to introduce fluidizing compressed air into the powder chamber 22 during the powder coating operation of the powder coating system 1. The powder container 24 further comprises at least one fluidizing compressed air outlet 31 having an outlet opening through which the fluidizing compressed air introduced into the powder chamber 22 can be discharged again for the purpose of pressure equalization. The outlet opening of the fluidizing compressed air outlet 31 is preferably identical to the outlet opening of the residual powder outlet 33.

The following will reference the depictions provided in FIGS. 2*a* and 2*b* in describing an exemplary embodiment of a powder container 24 of a powder supply device for a powder coating system 1 in greater detail. The powder container 24 depicted in FIGS. 2*a* and 2*b* is particularly suitable as a component of the powder coating system 1 described above with reference to the FIG. 1 depiction.

As shown in FIG. 2*a*, the exemplary embodiment is a powder container 24 which is closed or is closable by means of a cover 23, wherein the cover 23 is preferably connectable to the powder container 24 by means of a quick-releasing connection. The powder container depicted in FIG. 2*a* comprises a substantially cube-shaped powder container 22 for accommodating coating powder. At least one purifying compressed air inlet 32-1, 32-2 is provided in a side wall 24-3 of the powder container 24 to which a compressed air source 6 for introducing purifying compressed air into the powder chamber 22 can be connected to remove residual powder from the powder chamber 22 via a compressed air line during a cleaning operation of the powder coating system 1. A residual powder outlet 33 is further provided on the above-cited side wall 24-3 of the powder container 24 which comprises an outlet opening through which residual powder can be driven out of the powder chamber 22 by means of the purifying compressed air introduced into said powder chamber 22 during the cleaning of the powder coating system 1.

As can be particularly noted from the depiction provided in FIG. 2*b*, a total of two purifying compressed air inlets 32-1, 32-2 are provided in the exemplary embodiment of the powder container 24, wherein each of the two purifying compressed air inlets 32-1, 32-2 comprises an inlet opening. On the other hand, just one residual powder outlet 33 having exactly one outlet opening is provided, wherein the two inlet openings of the purifying compressed air inlets 32-1, 32-2 are vertically distanced from the outlet opening of the residual powder outlet 34.

In detail, and as can be particularly noted from the FIG. 2*b* depiction, the exemplary embodiment provides for the outlet opening of the residual powder outlet 33 to be provided in an upper region of the side wall 24-3 of the powder container 24 and the two inlet openings of the purifying compressed air inlets 32-1, 32-2 in a lower region of the side wall 24-3 of the powder container 24. This specific arrangement to the inlet openings on the one hand and the outlet opening on the other results in the purifying compressed air introduced into the powder chamber 22 during the cleaning operation of the powder coating system 1 first swirling any residual powder possibly still adhering to the bottom wall 24-2 of the powder container 24 and said purifying compressed air carrying it out of the powder chamber 22 through the outlet opening of the residual powder outlet 33.

On the other hand, as indicated in FIG. 2*a*, an air roller 35 is configured in the powder chamber 22. Said air roller 35 effectively enables any possible residual powder which may still be adhering to the walls 24-1, 24-2, 24-3, 24-4, 24-5 of the powder container 24 and the cover 23 of the powder container 24 to be dislodged during the cleaning procedure and carried out of said powder container 22. Because the outlet opening of the residual powder outlet 33 is disposed in the upper region of that side wall 24-3 of the powder container 24 in which the inlet openings of the two purifying compressed air inlets 32-1, 32-2 are also provided, purifying compressed air introduced into the powder chamber 22 can be conducted out of the powder chamber 22 again—after flowing past the side walls 24-1, 24-3, 24-4, 24-5 as well as the bottom wall 24-2 and the inner wall of the cover of the powder container 24—without much change in direction. This has the consequence of at least most of the residual powder carried along with the purifying compressed air being able to be discharged from the powder chamber 22 together with said purifying compressed air. The exemplary embodiment depicted in FIGS. 2*a* and 2*b* provides for the inlet openings of the two purifying compressed air inlets 32-1, 32-2 to serve as powder inlet openings in the powder coating operation of the powder coating system 1 to which powder feed lines 20, 20' can be connected external of the powder chamber 22 for feeding coating powder into said powder chamber 22 as needed. Thus, each purifying compressed air inlet 32-1, 32-2 in the powder coating operation of the powder coating system 1 in the exemplary embodiment is accorded the function of a powder inlet 20-1, 20-2 which can be fluidly connected to the powder feed lines 20, 20' as needed. However, it is of course also conceivable to provide separate powder inlets 20-1, 20-2 additionally to the purifying compressed air inlets 32-1, 32-2.

The embodiment depicted in FIGS. 2*a* and 2*b* provides for the inlet opening of one of the two powder inlets 20-1, 20-2 serving to supply fresh powder as needed and the inlet opening of the other of the two powder inlets 20-2, 20-1 to supply recovered powder as needed during the powder coating operation of the powder coating system 1. It is of course however also conceivable for recovered powder as well as fresh powder to be able to be supplied as needed during the powder coating operation of the powder coating system 1 via the inlet opening of one and the same powder inlet 20-2, 20-1.

A fluidizing device 30 for introducing fluidizing compressed air into the powder chamber 22 is preferably provided in the embodiment depicted in FIG. 2*a* and FIG. 2*b*. The fluidizing compressed air can be introduced into the powder chamber 22 through a front wall, longitudinal side wall, bottom wall or cover wall. According to the depicted embodiment, the bottom wall 24-2 of the powder chamber 22 is designed as a fluidizing bottom. It comprises a plurality of open pores or narrow holes through which fluidizing compressed air from a fluidizing compressed air chamber disposed below the bottom wall can flow upward into the powder chamber 22 in order to therein displace (fluidize) the coating powder into suspension during the powder coating operation of the powder coating system 1 so as to be easily drawn off by a powder dispensing device. The fluidizing compressed air is supplied to the fluidizing compressed air chamber via a fluidizing compressed air inlet. So that the pressure within the powder chamber 22 will not exceed a predefinable maximum pressure during the operation of the fluidizing device 30, the powder chamber 22 comprises at least one fluidizing compressed air outlet 31 having an outlet opening for discharging the fluidizing compressed air introduced into the powder chamber 22 and effecting pressure equalization. In particular, the outlet opening of the at least one fluidizing compressed air outlet 31 is to be dimensioned such that a maximum positive pressure of 0.5 bar compared to the atmospheric pressure prevails in the powder chamber 22 during operation of the fluidizing device 30.

In the embodiment depicted in FIGS. 2*a* and 2*b*, the outlet opening of the residual powder outlet 33 is identical to the outlet opening of the fluidizing compressed air outlet 31. It is of course however also conceivable for the fluidizing compressed air outlet 31 to be provided in the cover 23 of the powder container 24, for example.

As can be noted particularly from the FIG. 2*a* depiction, the fluidizing compressed air outlet 31 comprises a vent line in the depicted embodiment which is connected or connectable to a riser 27 external of the powder chamber 22 to prevent a discharge of powder from the powder chamber 22 during the powder coating operation of the powder coating system 1. To discharge the fluidizing compressed air introduced into the powder chamber 22, it is further conceivable to provide a vent line which preferably extends into the upper region of the powder chamber 22. The projecting end of the vent line can rise into an intake funnel of an exhaust system. This exhaust system can be designed for example as an air amplifier (air mover). An air amplifier, which is also known as an air mover, works according to the Coanda effect and is actuated by ordinary compressed air which needs to be supplied in small amounts. Said volume of air has a higher pressure than the ambient pressure. The air amplifier generates an airflow of high velocity, high volume and low pressure in the suction funnel. Hence, an air amplifier is particularly well suited in connection with the vent line or fluidizing compressed air outlet 31 respectively.

In the exemplary embodiment depicted in FIG. 2*a*, the powder container 24 comprises a non-contact level sensor S1, S2 for detecting the maximally permissible powder level in the powder chamber 22.

It is hereby conceivable for a further level sensor to be provided which is arranged relative to the powder container 24 so as to detect a minimum powder level and, as soon as this minimum powder level is reached and/or fallen short of, correspondingly signals a control device 3 to preferably automatically supply fresh powder or recovered powder to the powder chamber 22 via the inlet opening of the at least one powder inlet 20-1, 20-2. The level sensor S1, S2 for detecting the powder level in the powder chamber 22 is preferably a non-contact level sensor and arranged separately from the powder chamber 22 externally of same. Doing so prevents fouling of the level sensor S1, S2. The level sensor S1, S2 generates a signal when the powder level reaches a certain height. A plurality of such powder level sensors S1, S2 can also be arranged at different heights, to detect for example predetermined maximum levels and to detect a predetermined minimum level.

The signals of the least one level sensor S1, S2 are used, for example, to control an automatic powder supply of coating powder into the powder chamber 22 through the powder inlets 20-1, 20-2 in order to also maintain a predetermined level or predetermined level range therein during the period when the powder pumps 4 configured here as single-chamber dense phase powder pumps 200 suck coating powder out of the powder chamber 22 and pneumatically pump it to the spraying devices 40 (or into other containers). During such a powder spray coating operation, purifying compressed air is not channeled into the powder chamber 22, or only done so at reduced pressure. To clean the powder chamber 22 during coating breaks, for example when changing from one type of powder to another type of powder, purifying compressed air is fed through the at least one purifying compressed air inlet 32-1, 32-2 of the powder chamber 22. The purifying compressed air creates an air roller 35 within the powder container 24 which dislodges any residual powder which may be adhering to the inner wall of the powder container 24 and drives it out of the powder chamber 22 through the residual powder outlet 34.

Although not explicitly depicted in the drawings, it is further conceivable to provide a device for measuring the air pressure prevailing in the powder chamber 22. This is important to the extent of how much care needs to be taken to ensure that too much excess pressure cannot build up inside the powder container 24 from the introduction of fluidizing compressed air during the powder coating operation of the powder coating system 1 or from the introduction of purifying compressed air during the cleaning operation of the powder coating system 1 respectively since the powder container 24 is not as a rule designed as a high-pressure storage container. It is preferential in this respect for the maximally allowable positive pressure in the powder chamber 22 not to exceed 0.5 bar.

It is particularly conceivable with the above-cited embodiment for the air pressure measured in the powder chamber 22 continuously or at prespecified times or upon prespecified events to be supplied to a control device 3, wherein the amount of fluidizing compressed air to be supplied to the powder chamber 22 per unit of time and/or the amount discharged out of the powder chamber 22 via the at least one fluidizing compressed air outlet 31 per unit of time is preferably automatically adjusted as a function of the air pressure prevailing in the powder chamber 22. During the cleaning operation of the powder coating system 1, however, it is preferential for the control device 3 to preferably automatically set the amount of the purifying compressed air supplied to the powder chamber 22 per unit of time and/or the amount of the purifying compressed air discharged per unit of time via the at least one residual powder outlet 33 as a function of the air pressure prevailing in the powder chamber 22.

As can be noted from the FIG. 2*a* depiction, the example embodiment provides for a powder outlet 25 in the bottom wall 24-2 of the powder container 24 able to be opened by means of a pinch valve 21 to remove coating powder as needed from the powder chamber 22, preferably by the force of gravity. This then becomes particularly necessary during a color or powder change when there is still coating powder of the old type left within the powder chamber 22.

It is particularly preferential for the powder chamber 22 to exhibit an angular inner configuration in which the bottom surface and the side surfaces of the powder chamber 22 are connected together by the edges, particularly right-angled edges. This angular inner configuration to the powder chamber 22 ensures that the air roller 35 forming inside the powder chamber 22 during the cleaning operation of the powder coating system 1 does not develop a laminar but instead a turbulent boundary layer, which facilitates the removal of the residual powder adhering to the inner wall of the powder container 24. In order to be able to form the most ideal air roller 35 possible inside the powder container 24 during the cleaning operation of the powder coating system 1, it has been shown in practice that it is preferable for the powder chamber 22 to have a height of 180 mm to 260 mm, preferably 200 mm to 240 mm, and further preferably 220 mm, whereby the powder chamber 22 has a width of 140 mm to 220 mm, preferably 160 mm to 200 mm, and further preferably 180 mm, and whereby the powder chamber 22 has a length of 510 mm to 590 mm, preferably 530 mm to 570 mm, and further preferably 550 mm. With these given dimensions of the powder chamber 22, the at least one purifying compressed air inlet 32-1, 32-2 and the at least one residual powder outlet 33 are further to be provided in a common front wall 24-3 of the powder container 24.

The powder supply device shown in FIGS. 2*a* and 2*b* further comprises at least one powder dispensing device to pump coating powder through powder lines 38 to spraying devices 40 by means of preferably a plurality of powder pumps 4 and to be able to spray onto an object 2 to be coated by means of the latter. As FIG. 2*a* shows, corresponding powder discharge openings 36 are provided in the chamber walls 24-4 and 24-5 of the powder container 24. The depicted embodiment provides for each of the powder discharge openings 36 to be fluidly connected to an associated powder pump 4 so as to be able to suck up coating powder from the powder chamber 22 in the powder coating operation of the powder coating system 1 and supply the spraying devices 40.

The powder discharge openings 36 preferably have an elliptical form such that the effective area for drawing in fluidized coating powder is increased. The powder discharge openings 36 are disposed as low as possible within the powder chamber 22 in order for the powder pumps 4 configured here as single-chamber dense phase powder pumps 200 to be able to extract the absolute most possible coating powder from the powder chamber 22. The powder pumps 4 are preferably situated at a higher point than the highest powder level and are each connected to one of the powder discharge openings 36 via a powder dispensing channel 13 (depicted with dotted lines in FIGS. 2*a* and 2*b*). Because the powder pumps 4 configured as single-chamber dense phase powder pumps 200 are disposed higher than the maximum powder level, this prevents the coating powder from rising out of the powder chamber 22 into the powder pumps 4 configured as single-chamber dense phase powder pumps 200 when the powder pumps 4 are not switched on.

The powder dispensing channel 13 can be formed for example in a dip tube extending into the powder chamber 22 or—as provided for in the embodiment as per FIGS. 2*a* and 2*b*—in a side wall 24-4, 24-5 of the powder container 24.

As depicted in FIG. 2*b*, at least one powder pump 4 is provided at the side wall 24-5 of the powder container 24. Same is in particular configured as a single-chamber dense phase powder pump 200 which comprises only one single powder chamber 204 for drawing the coating powder. In the single-chamber dense phase powder pump 200, the coating powder is sucked out of the powder chamber 22 (suction phase) by means of negative pressure to which the powder chamber 22 is at times subjected. In a second phase (delivery phase), the extracted coating powder is pushed out of the powder feed chamber 204 toward a powder spraying device by a positive pressure being applied to the powder feed chamber 204.

The powder pump 4 configured as a single-chamber dense phase powder pump 200 is fixed at the upper end section of the powder container 24 and detachably connected to the powder dispensing channel 13. As already stated above, the powder dispensing channel 13 thereby extends particularly through the side wall 24-5 of the powder container 24 and leads into the powder chamber 22 via a preferably elliptical powder discharge opening 36.

Figure 4:
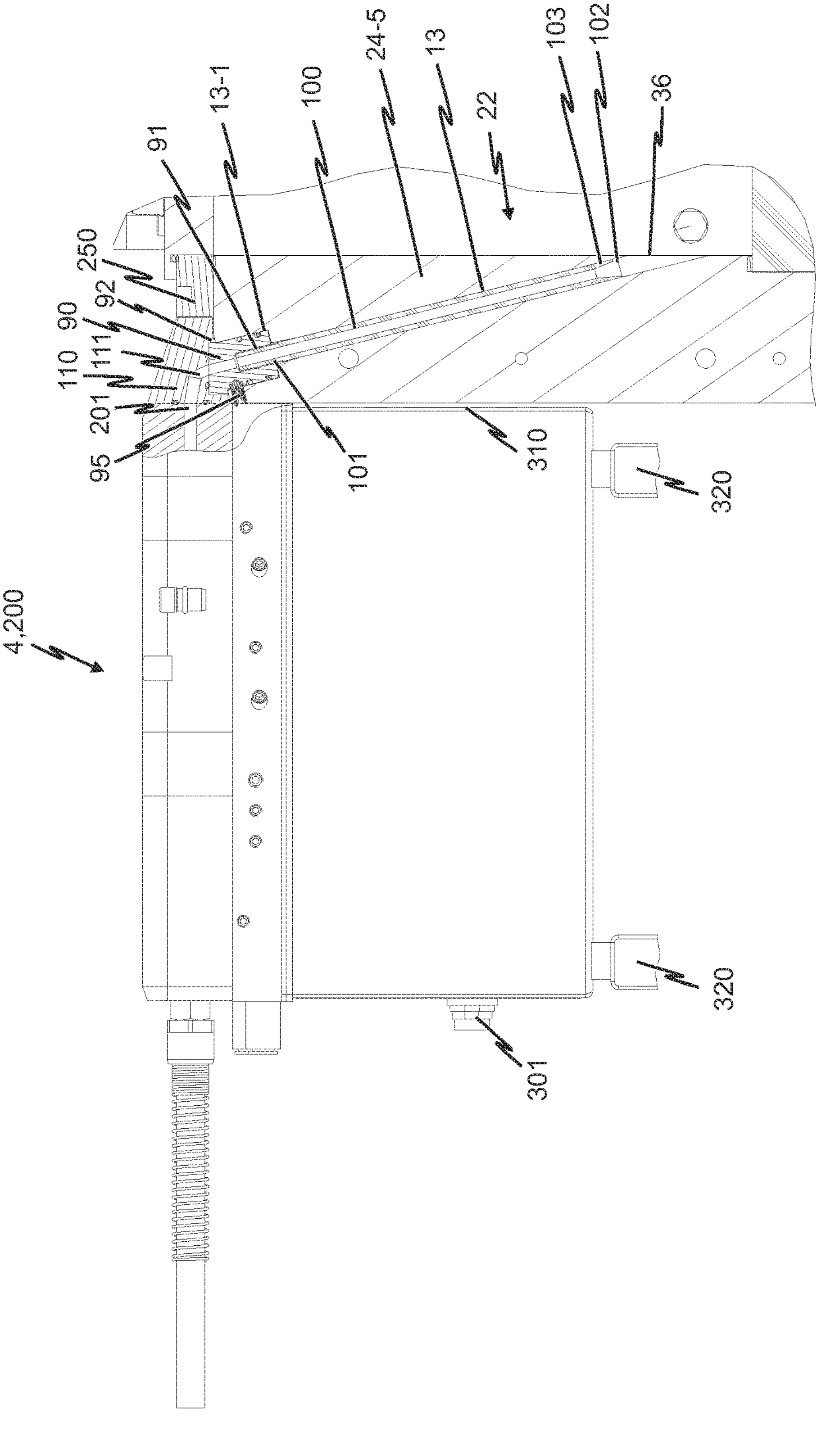
FIG. 4: a partly sectional view through the powder container with attached powder pump arrangement shown in FIG. 2*b*.

An enlarged partly sectional view of the powder supply device depicted in FIG. 2*b* is shown in FIG. 4. It is evident from same that the powder dispensing channel 13 extends diagonally upward from the powder discharge opening 36 to the upper end section of the side wall 24-5 of the powder container 24. At the upper end section of the side wall 24-5; i.e. at the upper end section of the powder container 24, a suction tube connector 90 is provided for fixing the dense phase powder pump 100 connected to the powder dispensing channel 13. The suction tube connector 90 is hereby positioned in a preferably cylindrical recess 13-1. The suction tube connector 90 is thereby configured correspondingly complementary in order to be able to be inserted into the cylindrical recess 13-1 of the powder dispensing channel 13. Additionally hereto, the suction tube connector 90 can also be affixed to the upper end section of the powder dispensing channel 13 by means of a further fixing element 95 (e.g. grub screw) introduced into the side wall 24-5 of the powder container 24. The fixing element can thereby engage into for example a recess of the suction tube connector 90 provided for the purpose. As will be described in greater detail below, the suction tube connector 90 can be used to connect the powder pump 4 configured as a single-chamber dense phase powder pump 200 to the side wall 24-5 of the powder container 24.

Figure 3A:
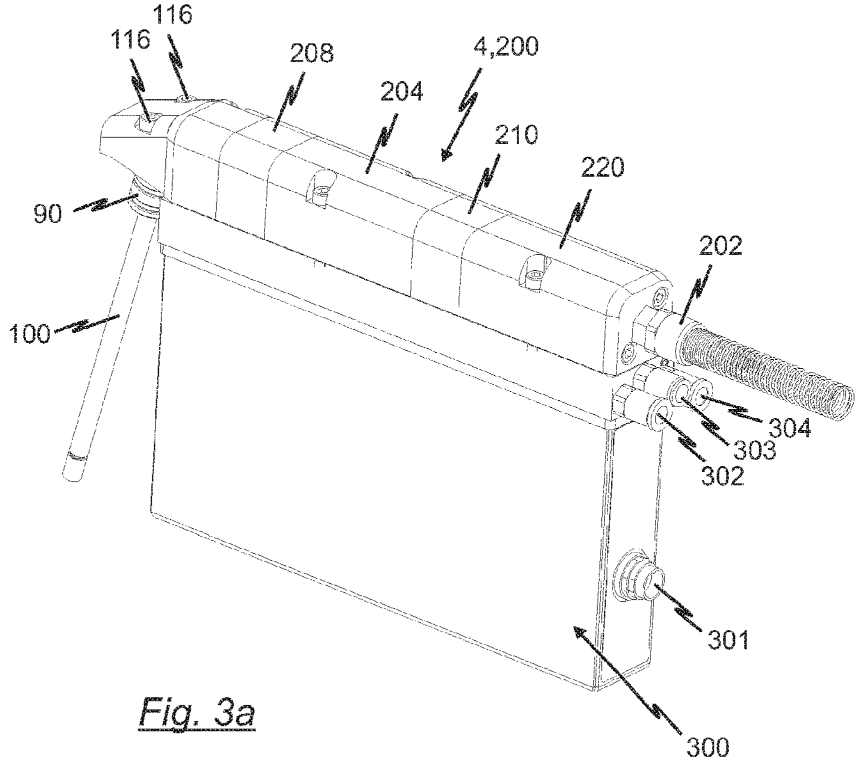
FIG. 3*a*: a perspective side view of the powder pump depicted in FIG. 2*b;*

The powder supply device according to an embodiment of the invention further comprises a suction tube 100 shown in FIGS. 3*a* to 4 able to be connected to a through-hole 91 of the suction tube connector 90. The through-hole 91 of the suction tube connector 90 can hereby have an internal thread into which the external thread 101 of the suction tube 100 is screwed. The suction tube 100 is in particular configured so as to be insertable into the powder dispensing channel 13. To this end, the suction tube 100 specifically exhibits an outer diameter which substantially corresponds to the inner diameter of the powder dispensing channel 13.

The inserting of the suction tube 100 reduces the inner diameter of the powder dispensing channel 13. This can reduce the lift needed to suck the coating powder out of the powder chamber 22. The inner diameter of the suction tube 100 is particularly in a range of from 3 mm to 10 mm, preferably in a range of from 5 mm to 8 mm, and particularly preferably approximately 4 mm.

A hopper region 103 of widened inner diameter is provided at an end section 102 of the suction tube 100 opposite from the suction tube connector 90. The hopper region 103 prevents powder residue from the coating powder located in the powder chamber 22 from settling in the lower end section of the suction tube 100. The suction tube 100 furthermore has a length which substantially corresponds to the length of the powder channel.

It is thereby to be noted that the powder channel 13 leads particularly diagonally into the powder chamber 22 so that the suction tube 100 reaches just to the upper end of the powder discharge opening 36 such that the suction tube 100 will not enter into the powder chamber 22.

As indicated above, the powder dispensing channel 13 comprises a lower end section via which the powder dispensing channel 13 empties into the powder chamber 22 through a powder discharge opening 36 and an upper end section to which the suction tube connector 90 is fixed and fixable. The upper end section of the powder dispensing channel 13 is particularly situated at an upper end section of the powder container 24, whereby the suction tube connector 90 as well as the recess 13-1 are configured such that the suction tube connector 90 projects over the upper end section of the powder container 24. Accordingly, the suction tube connector 90 forms an extension 92 via which the dense phase powder pump 200 can be fixed to the side wall 24-5 of the powder container 24.

The dense phase powder pump 200 preferably comprises a connecting element 110 for this purpose which is detachably fixed to a first end region of the dense phase powder pump 200 facing the suction tube connector 90.

Figure 3B:
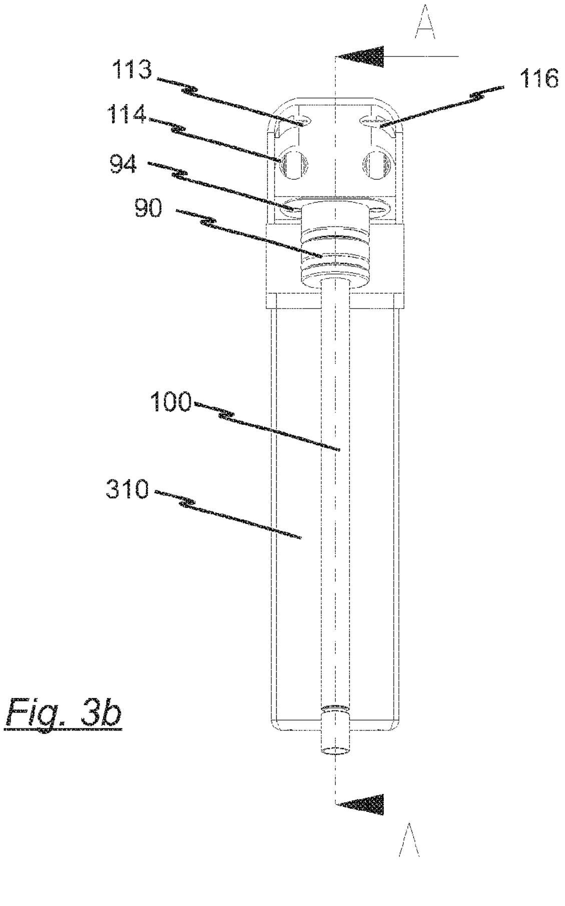
FIG. 3*b*: a frontal view of the powder pump depicted in FIG. 3*a;*

As can be learned for example from the frontal view of the powder pump 4 depicted in FIG. 3*b*, the connecting element 110 is preferably detachably connected to the front end region of the dense phase powder pump 4 by means of fixing elements (e.g. retaining screws). In the embodiment depicted here, the fixing elements are received in horizontal through-holes 114.

Figure 5:
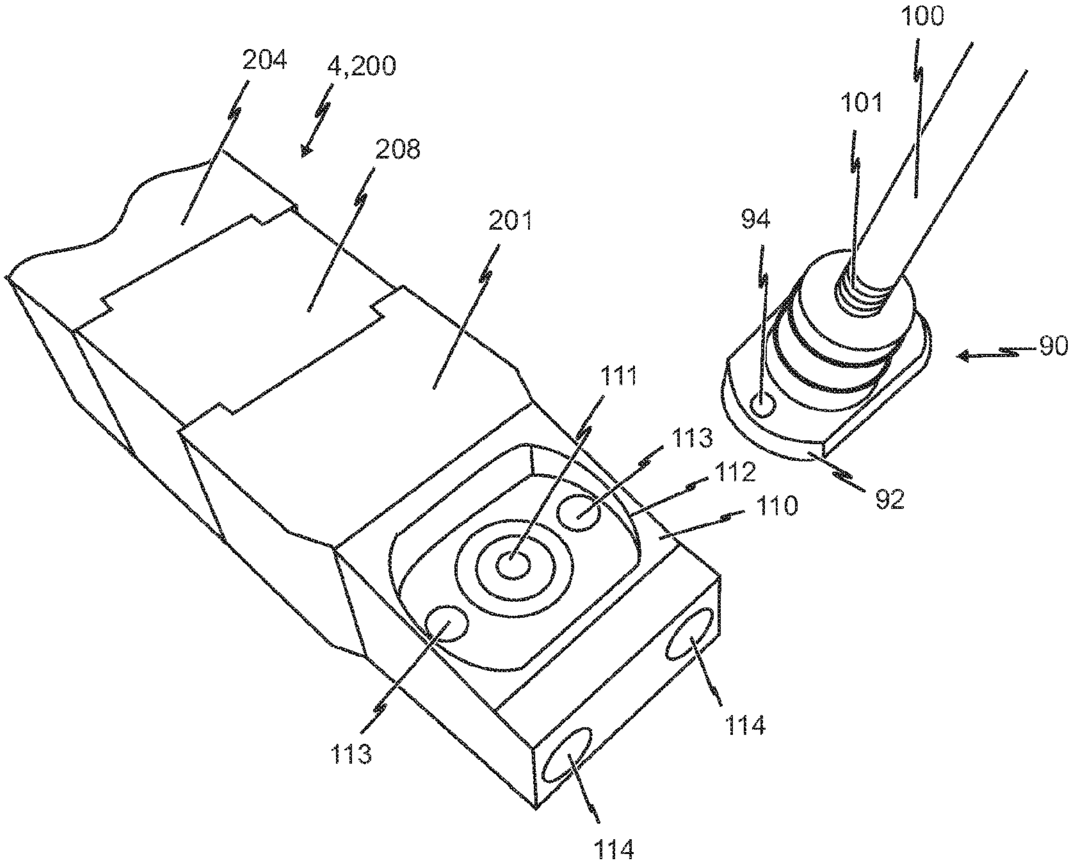
FIG. 5: a perspective schematic view of an embodiment of the connecting element as well as the suction tube connector.

The connecting element 110 serves to establish a force-fit connection between the suction tube connector 90 and the dense phase powder pump 200. To this end, the connecting element 110 can comprise a recess 112 at an end section facing the suction tube connector 90, same being particularly evident in FIG. 5. The recess 112 is designed to receive the projecting region; i.e. the extension 92 of the suction tube connector 90. Openings 94 can additionally be provided in the extension 92 of the suction tube connector 90 which align with vertical through-holes 114 of the connecting element 110 upon the connecting element 110 being connected to the suction tube connector 90. The fixing elements 116 (e.g. retaining screws) additionally shown in FIGS. 3*a* and 3*b* thus enable a secure connection to be realized between the connecting element 110 and the suction tube connector 90.

Figure 3C:
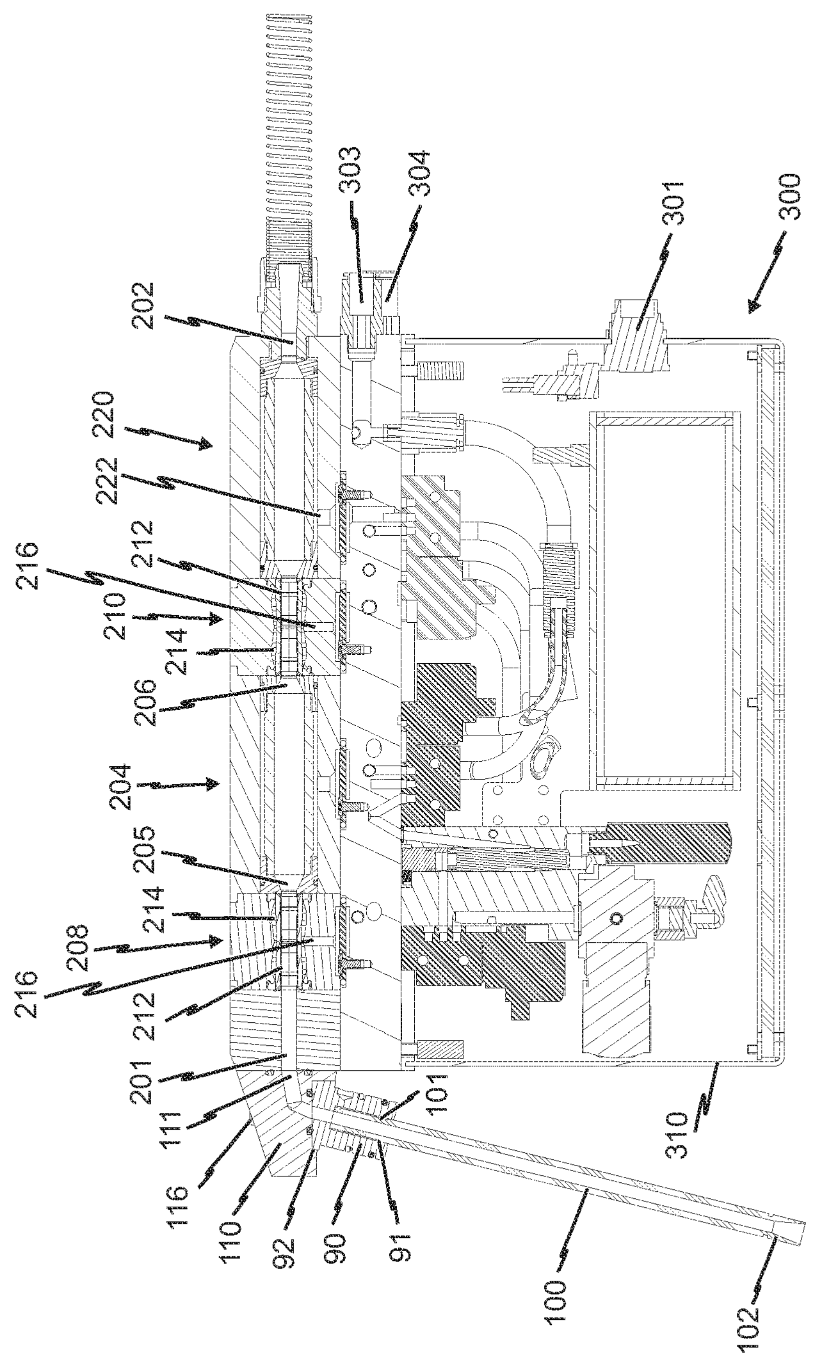
FIG. 3*c*: a cross-sectional view along the intersecting A-A axis of FIG. 3*b;*

FIG. 3*c* shows the powder pump 4 fixed to the suction tube connector 90 by means of connecting element 110 and configured as dense phase powder pump 200 in a cross-sectional view along the intersecting A-A axis indicated in FIG. 3*b*. Also to be recognized from this is that the connecting element 110 comprises a powder channel 111 which connects a powder channel of the suction tube 100 to a powder channel of the dense phase powder pump 200. In accordance with the embodiment as depicted here, the powder channel 111 of the connecting element 110 is angled so as to enable the substantially vertical suction tube 100 to connect to the substantially horizontal powder channel of the dense phase powder pump 200.

The powder pump 4 configured as dense phase powder pump 200 comprises a powder inlet 201 connected or connectable to the powder dispensing channel 13 which at the same time forms a front end region of the powder channel of the dense phase powder pump 200. A powder outlet 202 connected or connectable to an output-side powder reservoir (not shown), or a mechanism for spraying coating powder (not shown) respectively, is additionally provided. The powder inlet 201 is arranged on a first end region of the dense phase powder pump 200, wherein the powder outlet 202 is arranged on an oppositely disposed second end region of the dense phase powder pump 200. Situated between the powder inlet 201 and the powder outlet 202 is the previously cited single powder feed chamber 204 of the dense phase powder pump 200 designed to alternately draw powder out of the powder chamber 22 and pump it in the direction of the powder outlet 202.

The powder feed chamber 204 comprises a chamber inlet 205 at a first end section and a chamber outlet 206 at an oppositely disposed second end section. Specifically, a powder inlet valve 208 is further provided at the chamber inlet 205 by means of which the chamber inlet 205 of the powder feed chamber 204 is fluidly connected or connectable to the powder outlet 201 of the dense phase powder pump 200. A powder outlet valve 210 is provided at the chamber outlet 206 of the powder feed chamber 204 by means of which the single powder feed chamber 204 can be fluidly connected or connectable to the powder outlet 202 of the dense phase powder pump 200.

However, in contrast to the powder inlet region of the dense phase powder pump 200, the powder outlet valve 210 at the powder outlet region of the dense phase powder pump 200 is not disposed directly between the chamber outlet 206 of the powder feed chamber 204 and the powder outlet 202 of the dense phase powder pump 200; instead, an auxiliary compressed air inlet device 220 is additionally arranged between the powder outlet valve 210 and the powder outlet 202 of the dense phase powder pump 200. As will be described in greater detail in the following, this auxiliary compressed air inlet device 220 serves to feed additional compressed conveyor air as needed into the powder path between the powder outlet valve 210 and the powder outlet 202 of the dense phase powder pump 200.

It is to be pointed out at this point that it is not absolutely necessary for the auxiliary compressed air inlet device 220 to be arranged between the powder outlet valve 210 and the powder outlet 202 of the dense phase powder pump 200. The effect which can be realized with the auxiliary compressed air inlet device 220 can also be realized when the auxiliary compressed air inlet device 220 is arranged behind the powder outlet 202 of the dense phase powder pump 200.

Although not shown in the drawings, a further valve can be provided between the auxiliary compressed air inlet device 220 and the powder outlet 202 of the dense phase powder pump 200 in the dense phase powder pump 200 of the present invention which then assumes the function of the powder outlet valve.

The powder inlet and powder outlet valves 208, 210 shown in FIG. 3*c* are, as depicted, configured as pinch valves. They in particular each comprise a flexible, elastic tube 212 which can be squeezed by means of actuating compressed air in a pressure chamber 214 surrounding the tube to close the respective valve 208, 210.

To this end, an air exchange opening 216 is provided in each pressure chamber 214 which is connected to a corresponding control valve of a control device 300. The control device serves to alternately subject the pressure chambers 214 of both powder inlet and powder outlet valves 208, 210 respectively configured as pinch valves to positive pressure from a compressed air feed line.

The flexible, elastic tube 212 of the powder inlet valve 208 or powder outlet valve 210 respectively configured as pinch valves preferably has such elasticity or residual stress so as to independently stretch back out when the pressure of the actuating compressed air in the pressure chamber 214 ceases and thereby open the respective valve channel. Yet to support the opening of the pinch valve and thereby increase the switching frequency realizable with the dense phase powder pump 200, it is additionally also conceivable to subject the pressure chamber 214 to a negative pressure by means of the respective air exchange openings 216.

As already indicated above, to reduce or prevent pulsations downstream of the powder outlet 202 of the dense phase powder pump 200, an auxiliary compressed air inlet device 220 is provided at the outlet of the powder outlet valve 210 or powder outlet 202 of the dense phase powder pump 200 respectively in the exemplary embodiment of the dense phase powder pump 200 depicted in the drawings so as to be able to feed additional compressed conveyor air as needed into the powder path there.

Preferably the additional compressed air of the auxiliary compressed air inlet device 220 is supplied at an intermittent pulse frequency which is the same or preferably greater than the frequency of the powder feed chamber 204 at which the powder feed chamber 204 dispenses portions of powder. A pulsed compressed air or compressed air pulse generator can be provided for the auxiliary compressed air inlet device 220 for this purpose, same being connected via an air exchange opening 222 of the auxiliary compressed air inlet device 220.

It is clear from FIGS. 3*a* to 3*c* that a control device 300 which serves to control the individual elements of the dense phase powder pump 200 is further fixed at the lower end region of the dense phase powder pump 200. The control device 300 comprises a plurality of pressure or control air connections 301, 302, 303 and 304 to this end.

Although not shown in the drawings for the sake of clarity, it is nonetheless particularly preferential for the powder supply device 1 to comprise a plurality of single-chamber dense phase powder pumps 200 each connected or connectable to a respective powder dispensing channel 13 of the powder chamber 22. The powder dispensing channels 13 of the plurality of dense phase powder pumps 200 are thereby preferably configured in the two oppositely disposed side walls 24-4 and 24-5 of the powder chamber 22. In accordance with the concrete FIG. 2*a* embodiment, 12 dense phase powder pumps 200 would thus be respectively connected to the powder channels 13 of side walls 24-4 and 24-5.

This is also particularly enabled by the single-chamber design used for the dense phase powder pump 200 of the inventive powder supply device 1 being of particularly compact construction. Hence, the single-chamber dense phase powder pump 200 can have a width of for example just 40 mm, whereby a plurality of dense phase powder pumps 200 can be fixed to the side walls 24-4 and 24-5 of the powder container.

Returning to the representation according to FIG. 4, it is noted that the at least one dense phase powder pump 200 is preferably arranged adjacent to the powder container 24 such that a side surface 310 of the dense phase powder pump 200 facing the powder container 24 lies flat against an outer surface of the side wall 24-5 of the powder container 24. According to the embodiment depicted in FIG. 4, the dense phase powder pump 200 is accordingly fit to the suction tube connector 90 by means of connecting element 110 and concurrently supported by the outer surface of the side wall 24-5 in order to effectively compensate the torque forces produced by the weight of the dense phase powder pump 200.

FIG. 4 moreover shows that supporting elements 320 can be provided for the dense phase powder pump 200 beneath the control device 300 in order to even better distribute the weight of the dense phase powder pump 200. The supporting elements 320 can thereby be provided with elastic elements on their upper side so as to not damage the housing of the dense phase powder pump 200.

Lastly, it is noted that the at least one dense phase powder pump 200 according to the inventive powder supply device is disposed at a height relative to the powder chamber 22 which substantially corresponds to the adjustable powder level in the powder chamber 22. In other words, the dense phase powder pump 200 is preferably disposed at the height of the powder level inside powder chamber 22 in the inventive powder supply device. Doing so thus minimizes the lift required to convey the powder out of the powder chamber 22.

The present invention is not limited to the embodiments depicted in the drawings but rather yields from a synopsis of all the features disclosed herein together.

The invention claimed is:

1. A powder supply device for a powder coating system having at least one powder container comprising a powder chamber for coating powder and at least one powder pump connected or connectable to a powder dispensing channel emptying into the powder chamber via a powder discharge opening in order to suck coating powder out of the powder chamber during powder coating operation of the powder coating system, wherein the at least one powder pump is designed as a dense phase powder pump comprising at least one powder feed chamber for drawing the coating powder, wherein the powder dispensing channel is formed in a side wall of the powder container and the dense phase powder pump is connected or connectable to the powder dispensing channel via a suction tube connector, and wherein the powder supply device further comprises a suction tube connected or connectable to a through-hole of the suction tube connector, and wherein the suction tube is configured to be inserted into the powder dispensing channel.

2. The powder supply device according to claim 1, wherein the at least one powder pump is designed as a single-chamber dense phase powder pump comprising one single powder feed chamber for drawing the coating powder.

3. The powder supply device according to claim 1, wherein the powder chamber is of cube-shaped, cylindrical, conical or frustoconical configuration.

4. The powder supply device according to claim 3, wherein the powder chamber is configured beneath or within a cyclone separator.

5. The powder supply device according to claim 1, wherein the suction tube has an inner diameter of 3 mm to 10 mm.

6. The powder supply device according to claim 1, wherein the suction tube comprises a hopper region of expanded inner diameter at an end section opposite the suction tube connector.

7. The powder supply device according to claim 1, wherein the suction tube has a length which substantially corresponds to the length of the powder dispensing channel.

8. The powder supply device according to claim 1, wherein the powder dispensing channel comprises a lower end section via which the powder dispensing channel empties into the powder chamber through a powder discharge opening and an upper end section to which the suction tube connector is fixed or fixable, and wherein the upper end section of the powder dispensing channel is situated at an upper end section of the powder container.

9. The powder supply device according to claim 8, wherein the upper end section of the powder dispensing channel comprises a cylindrical recess designed to receive the cylindrical suction tube connector.

10. The powder supply device according to claim 9, wherein the suction tube connector is configured and accommodated in the recess such that said suction tube connector projects over the upper end section of the powder container.

11. The powder supply device according to claim 1, wherein the dense phase powder pump comprises a connecting element detachably affixed to a first end section of the dense phase powder pump facing the suction tube connector to create a force-fit connection between the suction tube connector and the dense phase powder pump.

12. The powder supply device according to claim 10, wherein the dense phase powder pump comprises a connecting element detachably affixed to a first end section of the dense phase powder pump facing the suction tube connector to create a force-fit connection between the suction tube connector and the dense phase powder pump; and wherein the connecting element comprises a recess on an end section facing the suction tube connector which is designed to receive the projecting section of the suction tube connector.

13. The powder supply device according to claim 2, wherein the dense phase powder pump comprises a powder inlet connected or connectable to the powder dispensing channel and a powder outlet connected or connectable to an output-side powder reservoir or to a device for spraying the coating powder respectively, wherein the powder inlet is arranged on a first end section of the dense phase powder pump and the powder outlet is arranged on a second end section of the dense phase powder pump opposite thereto, and wherein the single powder feed chamber is arranged between the powder inlet and the powder outlet of the dense phase powder pump.

14. The powder supply device according to claim 11, wherein the at least one powder pump is designed as a single-chamber dense phase powder pump comprising one single powder feed chamber for drawing the coating powder;

wherein the dense phase powder pump comprises a powder inlet connected or connectable to the powder dispensing channel and a powder outlet connected or connectable to an output-side powder reservoir or to a device for spraying the coating powder respectively, wherein the powder inlet is arranged on a first end section of the dense phase powder pump and the powder outlet is arranged on a second end section of the dense phase powder pump opposite thereto, and wherein the single powder feed chamber is arranged between the powder inlet and the powder outlet of the dense phase powder pump; and wherein the connecting element is connected or connectable to the powder inlet of the dense phase powder pump such that the powder inlet of the dense phase powder pump is substantially flush with an outer surface of the side wall.

15. The powder supply device according to claim 14, wherein the single powder feed chamber comprises a chamber intake at a first end section and a chamber exit at an opposite second end section, wherein the dense phase powder pump further comprises a powder inlet valve by means of which the chamber intake of the powder feed chamber is fluidly connected or connectable to the powder inlet of the dense phase powder pump and a powder outlet valve by means of which the chamber exit of the single powder feed chamber is fluidly connected or connectable to the powder outlet of the dense phase powder pump.

16. The powder supply device according to claim 15, wherein a control device is further provided to control the powder inlet valve and/or the powder outlet valve as well as to alternately generate a positive pressure and a negative pressure in the single powder feed chamber.

17. The powder supply device according to claim 15, wherein the powder inlet valve and the powder outlet valve can be controlled separately from each other.

18. The powder supply device according to claim 15, wherein the powder inlet valve and powder outlet valve are each respectively designed as a pinch valve, of a type comprising a flexible, elastic tube as the valve channel which can be squeezed by means of actuating compressed air in a pressure chamber surrounding the tube to close the respective valve.

19. The powder supply device according to claim 18, wherein a negative pressure can be generated in the pressure chamber of the respective valve to open the powder inlet valve and/or the powder outlet valve.

20. The powder supply device according to claim 15, wherein the dense phase powder pump comprises at least one auxiliary compressed air inlet device which feeds into at least one point in a powder path downstream of the powder outlet valve and serves to supply auxiliary compressed air as additional compressed conveyor air as needed.

21. The powder supply device according to claim 1, wherein the powder supply device comprises a plurality of dense phase powder pumps, each connected or connectable to a powder discharge channel of the powder chamber, and wherein the powder discharge channels of the plurality of dense phase powder pumps are configured in two opposite side walls of the powder chamber.

22. The powder supply device according to claim 1, wherein the at least one dense phase powder pump is arranged with respect to the powder chamber such that a side surface of the dense phase powder pump facing the powder chamber abuts an outer surface of the side wall of the powder chamber.

23. The powder supply device according to claim 1, wherein the at least one dense phase powder pump is arranged at a height relative to the powder chamber which substantially corresponds to the adjustable powder level in the powder chamber.

* * * * *